(12) United States Patent
Oblizajek et al.

(10) Patent No.: US 9,120,500 B2
(45) Date of Patent: Sep. 1, 2015

(54) SYSTEM AND METHOD FOR REDUCING STEERING WHEEL VIBRATION IN ELECTRONIC POWER STEERING SYSTEMS

(71) Applicant: GM Global Technology Operations LLC, Detroit, MI (US)

(72) Inventors: Kenneth L. Oblizajek, Troy, MI (US); John D. Sopoci, Commerce Township, MI (US); Suresh Puradchithasan, Ontario (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 167 days.

(21) Appl. No.: 13/840,030

(22) Filed: Mar. 15, 2013

(65) Prior Publication Data

US 2014/0277946 A1    Sep. 18, 2014

(51) Int. Cl.
  *B62D 5/04*    (2006.01)
(52) U.S. Cl.
  CPC .................................... *B62D 5/0472* (2013.01)
(58) Field of Classification Search
  USPC ........ 701/41, 42, 45, 74, 78, 75, 83; 180/400, 180/443, 446
  See application file for complete search history.

(56) References Cited

U.S. PATENT DOCUMENTS

2011/0071729 A1    3/2011  Oblizajek et al.
2012/0061169 A1*   3/2012  Oblizajek et al. ............. 180/446

* cited by examiner

*Primary Examiner* — Adam Tissot
(74) *Attorney, Agent, or Firm* — Ingrassia Fisher & Lorenz, P.C.

(57) ABSTRACT

Methods and apparatus are provided for reducing steering wheel vibrations in electronic power steering systems. The apparatus includes a processor and performs a method that estimates an average angular wheel speed of at least one wheel of the vehicle; determines an average wheel angle from the average angular wheel speed; generates sine and cosine functions of the average angular wheel angle; processes the sine and cosine functions with a steering wheel torque signal received from a torque sensor to extract amplitude components of at least one of the sine and cosine functions; reconstructs the sine and cosine functions using the steering wheel torque signal; combines the sine and cosine functions to provide a control signal, and controls the EPS system via the control signal to attenuate smooth road shake vibrations in a steering wheel of the vehicle.

20 Claims, 4 Drawing Sheets

SYSTEM AND METHOD FOR REDUCING STEERING WHEEL VIBRATION IN ELECTRONIC POWER STEERING SYSTEMS

TECHNICAL FIELD

The technical field generally relates to Electric Power Steering (EPS) systems, and more particularly relates to techniques for reducing periodic steering wheel vibrations that occur within an EPS system.

BACKGROUND

Electric Power Steering (EPS) systems use an electric motor that can be coupled directly to either the steering gear or steering column to reduce a driver's effort in steering the vehicle. During operation of the vehicle, the driver will apply a force to the steering wheel in an effort to steer the vehicle. This results in a "driver torque" being applied to a shaft that is coupled to the steering wheel. Torque sensors detect torque being applied to the steering column by the driver, and communicate this information to an electronic control unit. The electronic control unit generates a motor control signal that is applied to the electric motor causing it to generate a "motor assist torque" that is combined with the driver torque. This combined torque is then used to steer the vehicle. This allows varying amounts of assistance to be applied depending on driving conditions.

There are numerous types of unwanted vibrations, noises, pulsations, disturbances, and other forms of fluctuating vibratory energy that can exist in a vehicle; these phenomena are hereafter collectively and broadly referred to as "vibrations." Vibrations can have many sources, including external sources such as irregular road surfaces, as well as internal sources.

Periodic vibrations caused by internal sources can propagate throughout the vehicle and can cause an undesirable shake or movement of certain vehicle components that is noticeable to the driver. For instance, periodic vibrations generated at the wheel assemblies can combine to create a dynamic torque on a steering wheel column that causes the steering wheel to cyclically turn at small amplitudes in either direction. When this type of event occurs on a flat or smooth road surface, it is all the more apparent to the driver and is sometimes referred to as "smooth road shake" (SRS). SRS generally is most noticeable between approximately 50 to 100 mph, and exhibits a frequency of about 10 to 20 Hz. At 50 mph, smooth road shake occurs at approximately 10 Hz. SRS tends to increase as an approximately linear function of speed, such that, at 100 mph, SRS occurs at approximately 20 Hz. These vibrations can be sensed by the driver of the vehicle and such steering wheel vibrations may be distracting or annoying to the driver.

Accordingly, it is desirable to provide improved methods, systems and apparatus for suppressing steering wheel vibrations in vehicles having an EPS system. Furthermore, other desirable features and characteristics of the present invention will become apparent from the subsequent detailed description and the appended claims, taken in conjunction with the accompanying drawings and the foregoing technical field and background.

SUMMARY

An apparatus is provided for reducing steering wheel vibrations in electronic power steering systems. In one embodiment, the apparatus includes a sensor providing an average angular wheel speed of at least one wheel of a vehicle and a processor configured to: determine an average wheel angle from the average angular wheel speed; generate sine and cosine functions of the average angular wheel angle; process the sine and cosine functions with a steering wheel torque signal received from a torque sensor to extract amplitude components of at least one of the sine and cosine functions; reconstruct the sine and cosine functions using the steering wheel torque signal; combine the sine and cosine functions to provide a control signal and control the EPS system via the control signal to attenuate smooth road shake vibrations in a steering wheel of the vehicle.

A method is provided for reducing steering wheel vibrations in electronic power steering systems. In one embodiment, the method estimates an average angular wheel speed of at least one wheel of the vehicle; determines an average wheel angle from the average angular wheel speed; generates sine and cosine functions of the average angular wheel angle; processes the sine and cosine functions with a steering wheel torque signal received from a torque sensor to extract amplitude components of at least one of the sine and cosine functions; reconstructs the sine and cosine functions using the steering wheel torque signal; combines the sine and cosine functions to provide a control signal, and controls the EPS system via the control signal to attenuate smooth road shake vibrations in a steering wheel of the vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Figure 2:
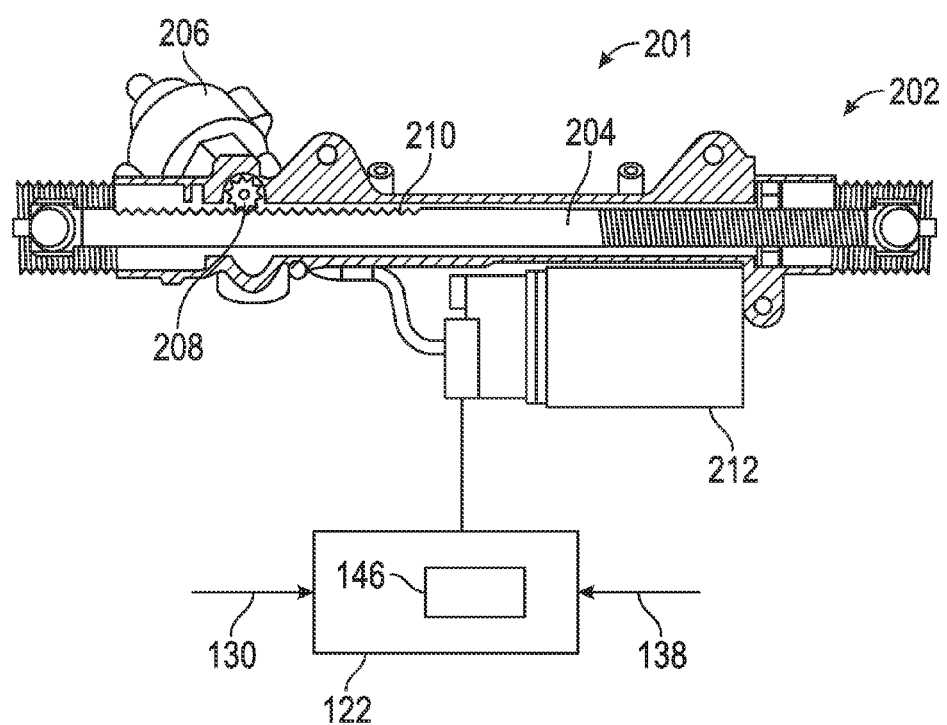
FIG. 2 is a partly sectional view of a rack electric power steering (REPS) system in accordance with an embodiment.
Figure 3:
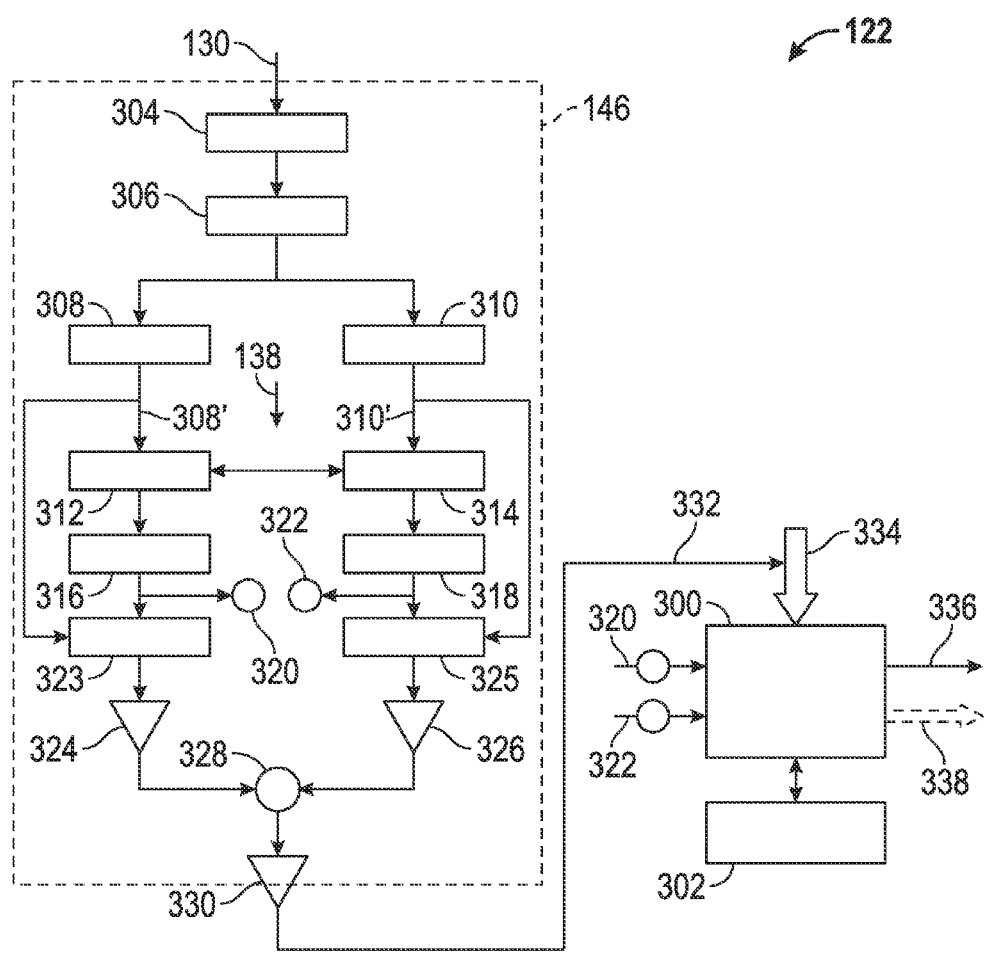
FIG. 3 is block diagram of a controller for an electronic power steering (EPS) system in accordance with an embodiment.

Finally, for the sake of brevity, conventional techniques and components related to vehicle electrical and mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-3 are merely illustrative and may not be drawn to scale.

Figure 1:
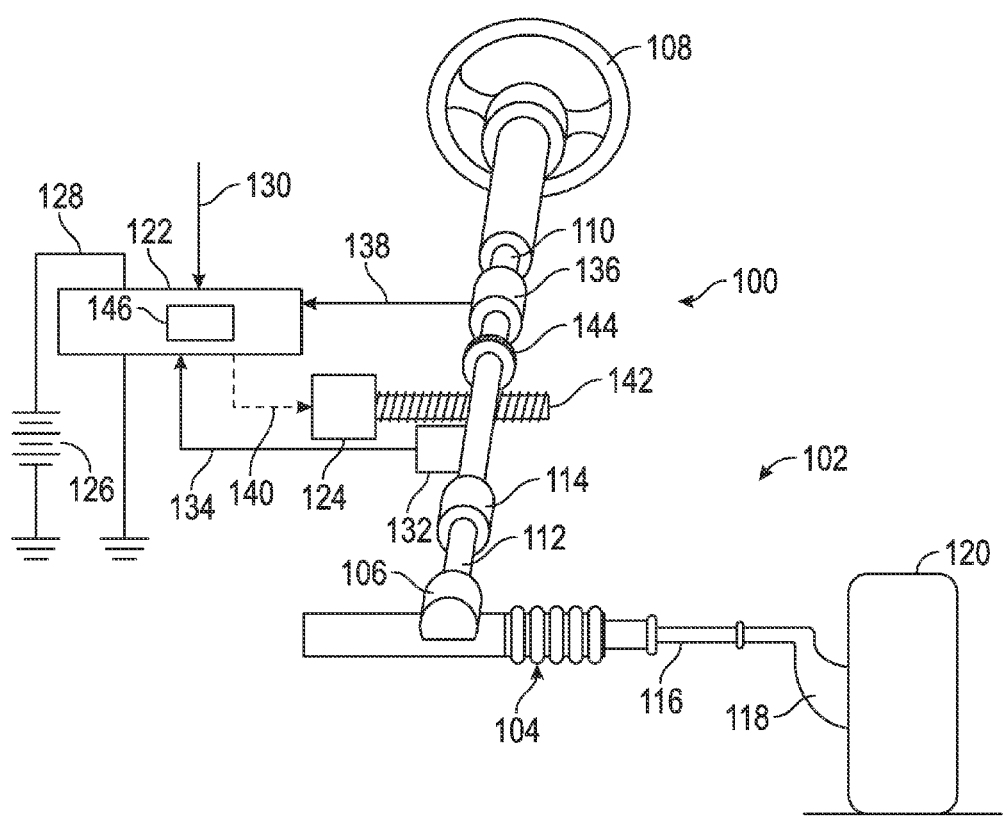
FIG. 1 is a schematic representation of an column electric power steering (CEPS) system in accordance with an embodiment.

Referring to FIG. 1, an exemplary embodiment of an electric power steering (EPS) system 100 for a vehicle 102 is shown. The embodiment of FIG. 1 illustrates a column EPS system (or CEPS system). The electric power steering system 100 may comprise a conventional rack and pinion steering mechanism 104, which includes a toothed rack (not shown) and a column pinion gear (not shown) under gear housing 106. As the steering wheel 108 is turned, an upper steering shaft 110 turns a lower shaft 112 through a rotary joint 114; and the lower steering shaft 112 turns the column pinion gear. Rotation of the column pinion gear moves the rack, which moves tie rods 116 (only one shown), which move steering knuckles 118 (only one shown) to turn tires 120 (only one shown).

The electric power assist is provided through a controller 122 and a power assist actuator comprising an electric drive motor 124. The controller 122 receives electric power from a vehicle electric power source 126 through a line 128, a signal representative of the vehicle velocity on line 130 and column pinion gear angle from a column rotational position sensor 132 on line 134. As the steering wheel 108 is turned, a torque sensor 136 senses the torque applied to steering wheel 108 by the vehicle operator and provides an operator torque signal to controller 122 on line 138. In response to the vehicle velocity, operator torque, and in some cases, column pinion gear angle signals received, the controller 122 derives desired electric motor currents and provides values for such currents through a bus 140 to the electric drive motor 124, which supplies torque assist to steering shaft 110 through worm gear 142 and motor pinion gear 144.

Accordingly to exemplary embodiments, the controller 122 includes a module 146 that functions to attenuate or reduce smooth road shake (SRS) and other steering wheel vibrations. The module 146 applies adaptive logic to process the vehicle speed (from line 130) and steering wheel torque (from line 138) that may be provided via conventional sensors for these functions. As will be discussed in detail in connection with FIGS. 3-4 below, the module processes these signals to produce a corrective signal used by the controller 122 to reduce or attenuate SRS or vibratory effects that may be noticed and annoying to the driver of the vehicle 102.

Exemplary embodiments of the present disclosure are also applicable to rack mounted electric power steering system. FIG. 2 depicts an example of an EPS system where the electric motor is mounted on the rack of the steering system (an REPS system). The electric power steering system 200 comprises a conventional rack and pinion steering mechanism 202, which includes a toothed rack 204 which is connected to the tie rods (not shown in FIG. 2) for directing the turning of the tires (not shown in FIG. 2). The steering column has an assembly 206 having a column pinion gear 208 which is meshed with the teeth 210 of the toothed rack 204 so that turning of the steering column applies a torque at the toothed rack that results in the toothed rack translating left or right, depending on the direction of the turning of the steering column. The electric drive motor 212 of the electric power steering system is connected to the toothed rack by a motor pinion gear 214, wherein the motor pinion gear may be mechanically connected, for example, by a belt or gear interface via, for example, a ballscrew mechanism 216. The electrical operation is as generally described with respect to the CEPS configuration of FIG. 1, as it is adapted to the REPS configuration of FIG. 2, where the module 146 of the controller 122 processes the vehicle speed (from line 130) and the steering wheel torque (138) to provide the controller 122 with a corrective signal that the controller can use to attenuate or reduce SRS and other vibratory effects that may be noticed by the driver of the vehicle.

Referring now to FIG. 3, a block diagram of a controller for an electronic power steering (EPS) system is illustrated. Typically, EPS systems that provide compensation for smooth road shake (SRS) employ a highly accurate measurement or approximation of angular wheel velocity (speed). This measurement may be provided by dedicated sensors positioned in or near wheel assemblies or may be estimated by use of anti-lock braking systems (ABS) in those vehicles employing ABS. However, the cost of dedicated sensors may be prohibitively high for some vehicles, and not all vehicles employ an ABS. Accordingly, the present disclosure provides compensation for SRS without the requirement of high accuracy angular wheel velocity data. Simple estimates of angular wheel velocity such as, for example, by a speedometer reading or by sensing a rotating gear in a transmission is sufficient for the SRS attenuation provided by the present disclosure.

As illustrated in FIG. 3, the EPS controller 122 includes in fundamental embodiments a module 146 and a processor 300 which may be coupled to a memory 302 (optionally, the processor 300 may have an internal memory). The module 146 provides a heterodyning function employing the speed data 130 and the steering wheel torque signal 138 which is used to provide correction for (i.e., attenuate) SRS effects such as those described in U.S. Patent Publication No. 2012/0061169 filed on Sep. 15, 2010 (which is hereby incorporated by reference). The speed data 130 is processed via an integrator 304 to provide an average wheel angle. This value may be stored (and updated) in block 306 which feeds a sine function generator 308 and a cosine function generator 310 which provide sine and cosine functions (308' and 310' respectively) for the average wheel angle. The sine and cosine signals are individually mixed with the torque signal 138 via mixers 312 and 314. This extracts the sine and cosine component of the torque signal 138, which is integrated via integrators 316 and 318. The output (320 and 322) of these integrators provide data that will be processed via a Fast Fourier Transform (FFT) analysis to determine offset values (periodically per sample) that will be used to compensate (i.e., attenuate) SRS effects as described more fully below. After extracting this data, sine and cosine signals are reconstructed by mixing the data (320 and 322) with the sine and cosine functions (308' and 310' respectively) in mixers 323 and 325. The reconstructed signals may be scaled (via amplifiers 324 and 326 respectively) before being combined (via summer 328). The output of summer 328 is a control signal for the EPS system that may be scaled (via amplifier 330) and transmitted to the processor 300 via line 332.

The control signal 332 is received by the processor 300 together with other inputs 334 as may be desired for any particular implementation. The processor 300 may combine, merge or supplement the control signal 332 with a number of other signals as is known in EPS systems. Non-limiting examples of such other signals include steering wheel angle, steering wheel torque, steering wheel velocity, steering wheel acceleration, steering wheel torque gradient, vehicle speed, vehicle fore-aft acceleration, and vehicle lateral acceleration. The processor then provides a control signal 336 to the EPS actuator (motor 124 or 212) which provides compensation for SRS due to the component provided by control signal 332. The processor 300 also receives the data 320 and 322 for performing the FFT analysis on the data and storing the results in the memory 302. Generally, only one of the output data (320 or 322) needs to be processed via the FFT function. Optionally, the controller 300 may distribute the FFT computations to other controllers in the vehicle via a bus 338. Distributing the FFT analysis provides an advantage in the event that the processor 300 is busy and other processors are available if not presently occupied by their intended functions.

Figure 4:
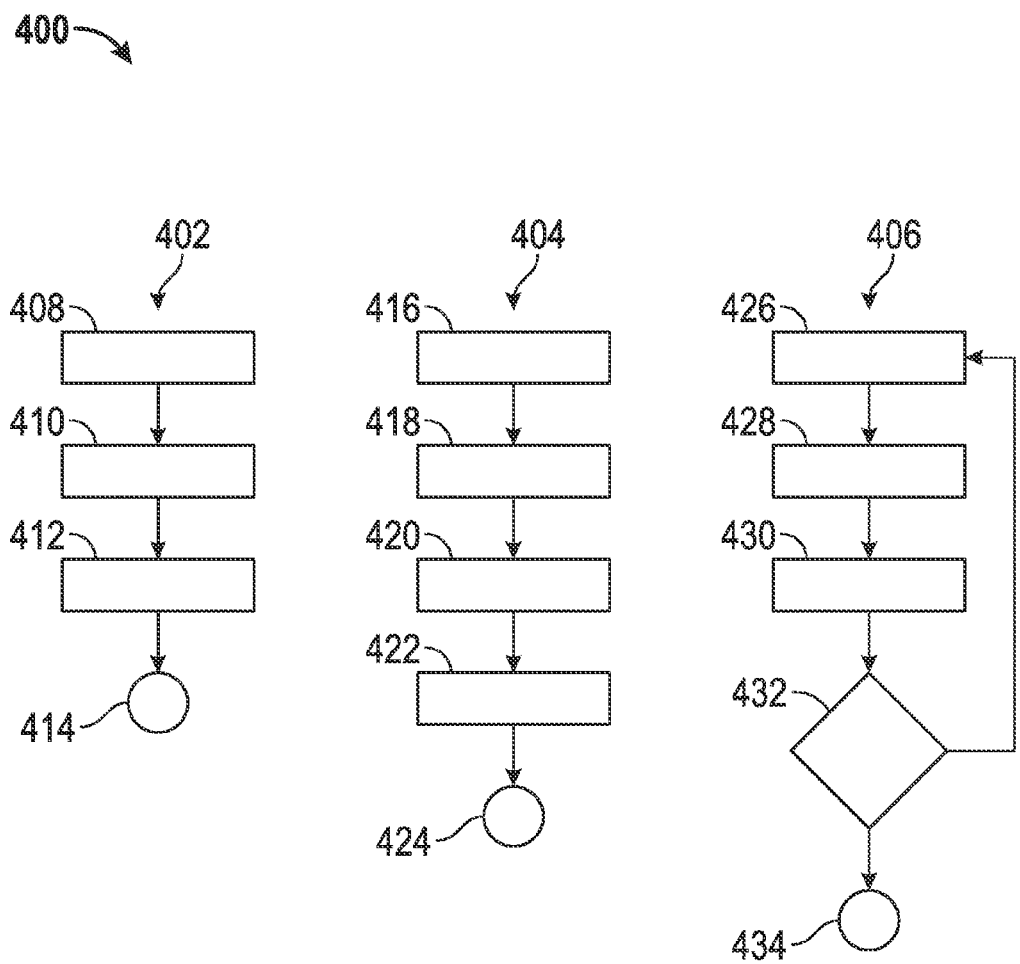
FIG. 4 is a flow diagram illustrating the modes of operation of the controller of FIG. 3 in accordance with an embodiment.

FIG. 4 illustrates flow diagrams useful for understanding the method and modes of operation for attenuating SRS in an EPS system. The various tasks performed in connection with the method of FIG. 4 may be performed by software, hardware, firmware, or any combination thereof. For illustrative purposes, the following description of the method of FIG. 4 may refer to elements mentioned above in connection with FIGS. 1-3. In practice, portions of the method of FIG. 4 may be performed by different elements of the described system. It should also be appreciated that the method of FIG. 4 may include any number of additional or alternative tasks and that the method of FIG. 4 may be incorporated into a more comprehensive procedure or process having additional functionality not described in detail herein. Moreover, one or more of the tasks shown in FIG. 4 could be omitted from an embodiment of the method of FIG. 4 as long as the intended overall functionality remains intact.

As illustrated in FIG. 4, the method 400 operates in three modes 402, 404 and 406. Mode 1 (402) is a learning mode, Mode 2 (404) is a verification mode and Mode 3 (406) is a monitoring mode of operation. In each mode, the FFT data (320 or 322) is employed to aid in providing the control signal (332 in FIG. 3) to attenuate SRS. The method 400 begins in Mode 1 (402) where the FFT data (320 or 322) is stored (for example in memory 302 of FIG. 3) in step 408. In some embodiments, the FFT data is only stored at such time when vehicle conditions are valid for collecting and storing the FFT data. Non-limiting examples of such conditions are when the vehicle is traveling at a substantially constant speed and particularly at speeds exceeding 45 miles per hour (72.42 kilometers per hour). Next, block 410 performs the FFT analysis such as via processor 300 (of FIG. 3) or via other processors via bus 338. In some embodiments, the FFT data is only processed at such time when conditions are valid for processing the FFT data. Non-limiting examples of such conditions are when a processor within the vehicle is available, such as, when the vehicle has stopped (e.g., stop sign, other traffic control signal or after key off is detected) during which time the processor 300 does not need to control the EPS system or with some other processor is not then required to be performing its intended function. After performing the FFT analysis, block 412 stores the results which include the average speed, an offset value which in some embodiments is the frequency difference between a stored based value and a calculated value (sometimes expressed as a percentage) and an offset polarity, which may be assumed to be a positive polarity during the initial execution of Mode 1 (402). At the completion of Mode 1 (402) step 414 triggers Mode 2 (406) to commence.

During Mode 2 (404), a percent of the offset value (derived in Mode 1) is applied to the average wheel velocity together with the offset polarity in step 416. In some embodiments, fifty percent (50%) of the offset value is used. As noted above, during the initial execution of the Mode 1, the offset polarity was assumed to be positive. Mode 2 verifies (or corrects) the offset polarity for further processing during Mode 3. To perform the verification process, the FFT data is again stored (block 418) and processed (block 420) as previously described in connection with blocks 408 and 410. Thus, block 420 provides a current offset value that can be compared in block 422 with the first offset value generated during Mode 1. If the current offset value exceeds the first offset value, then the offset polarity is set as negative. Otherwise, the offset polarity remains at the originally assumed positive polarity. The offset polarity having been verified (or corrected), step 424 triggers commencement of Mode 3 (406).

During Mode 3 (406) the method 400 operates to monitor the continually derived offset value to attenuate SRS. To do this, the learned offset value (from Mode 1) and the verified offset polarity (from Mode 2) is applied to the average wheel velocity for the next computation by the heterodyning module (146 in FIG. 3) in step 426. Blocks 428 and 430 again store and process the FFT data (320 or 322 in FIG. 3) when conditions are valid to provide a current offset value. Decision 432 compares the current offset (computed in Mode 3) with an offset threshold. In some embodiments, the offset threshold is approximately one-half of one percent (0.5%). If the current offset is less than the threshold, then the method 400 remains in Mode 3 and loops back to step 426. Conversely, if the threshold has been exceeded, step 434 triggers Mode 1 (402) to begin again and the method repeats. By applying the learned offset value (from Mode 1) and learned polarity (from Mode 2), any error due to the simple estimation of the average angular wheel velocity is quickly corrected and the control signal 323 to compensate for the effects of SRS is provided. In this way, the present disclosure provides compensation (attenuation) of the effects of SRS without a highly accurate measurement or estimation of average angular wheel velocity making the present disclosure an affordable and readily implemented SRS compensation system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. In a vehicle having a processor, a plurality of sensors providing signals to the processor during operation of the vehicle and a Electric Power Steering (EPS) system responsive to the processor to attenuate smooth road shake occurring in a steering wheel during operation of the vehicle, a method, comprising:
(a) receiving, by the processor, a signal representing vehicle speed from one of the plurality of sensors during operation of the vehicle and using the vehicle speed as an estimation of an average angular wheel speed of at least one wheel of the vehicle;

(b) determining, by the processor, an average wheel angle from the estimation of the average angular wheel speed;

(c) generating, by the processor, sine and cosine functions of the average angular wheel angle;

(d) processing, by the processor, the sine and cosine functions with a steering wheel torque signal received from a torque sensor to extract amplitude components of at least one of the sine and cosine functions;

(e) processing, by the processor, the amplitude components to provide a corrected average angular wheel speed;

(f) reconstructing, by the processor, the sine and cosine functions using the steering wheel torque signal;

(g) combining, by the processor, the sine and cosine functions to provide a control signal; and (h) repeating steps (a) through (g) during operation of the vehicle resulting in the processor controlling an actuator in the EPS system via the control signal to attenuate the smooth road shake vibrations in the steering wheel of the vehicle.

2. The method of claim 1, wherein processing the amplitude components to provide a corrected average angular wheel speed is performed when the vehicle is traveling at a substantially constant speed.

3. The method of claim 2, where the processing the amplitude components to provide a corrected average angular wheel speed is performed when the vehicle is traveling at a substantially constant speed exceeding 45 miles per hour (72.42 kilometers per hour).

4. The method of claim 1, wherein the processor processing the amplitude components comprises:
performing, by the processor, a Fast Fourier Transform (FFT) analysis on the amplitude components to provide FFT data;
processing, by the processor, the FFT data to provide the corrected average angular wheel speed.

5. The method of claim 4, wherein processing the FFT data is performed when the processor within the vehicle is available for processing the FFT data during the operation of the vehicle.

6. The method of claim 4, wherein processing the FFT data is performed via the processor within the vehicle when the vehicle comes to a stop during the operation of the vehicle.

7. In a vehicle having a processor, a plurality of sensors providing signals to the processor during operation of the vehicle and a Electric Power Steering (EPS) system responsive to the processor to attenuate smooth road shake occurring in a steering wheel during operation of the vehicle, a method, comprising:

(a) receiving, by the processor, a signal representing vehicle speed from one of the plurality of sensors during operation of the vehicle and using the vehicle speed as an estimation of an average angular wheel speed of at least one wheel of the vehicle;

(b) determining, by the processor, an average wheel angle from the estimation of the average angular wheel speed;

(c) generating, by the processor, sine and cosine functions of the average angular wheel angle;

(d) processing, by the processor, the sine and cosine functions with a steering wheel torque signal received from a torque sensor to extract amplitude components of at least one of the sine and cosine functions;

(e) performing, by the processor, a Fast Fourier Transform (FFT) analysis on the amplitude components to provide FFT data;

(f) processing the FFT data to provide a corrected average angular wheel speed by the processor;
generating a first offset value and a first offset polarity;
applying the first offset polarity and a percentage of the first offset value when generating the sine and the cosine functions of the average angular wheel angle; and
after repeating steps (b) through (h), setting a current offset polarity as negative when a current offset value exceeds the first offset value else setting the offset polarity as positive;

(g) reconstructing, by the processor, the sine and cosine functions using the steering wheel torque signal;

(h) combining, by the processor, the sine and cosine functions to provide a control signal; and (i) repeating steps (a) through (h) during operation of the vehicle resulting in the processor controlling an actuator in the EPS system via the control signal to attenuate the smooth road shake vibrations in the steering wheel of the vehicle.

8. The method of claim 7, wherein processing the FFT data comprises:
applying, by the processor, the current offset value and the current offset polarity when generating the sine and the cosine functions of the average angular wheel angle; and
after repeating steps (b) through (h), comparing the current offset value with a threshold value and maintaining the current offset value when the current offset value is below the threshold value.

9. An Electronic Power Steering (EPS) system, comprising:
a sensor providing a signal representative of a speed of a vehicle;
a torque sensor providing a torque signal from a steering wheel during operation of the vehicle; and
a processor coupled to the sensor and the torque sensor for processing the signal and the torque signal to:
determine an average wheel angle using the signal representative of the speed of the vehicle as an estimation of an average angular wheel speed of a wheel of the vehicle during the operation of the vehicle;
generate sine and cosine functions of the average angular wheel angle;
process the sine and cosine functions with a steering wheel torque signal received from a torque sensor to extract amplitude components of at least one of the sine and cosine functions;
process the amplitude components to provide a corrected average angular wheel speed;
reconstruct the sine and cosine functions using the steering wheel torque signal;
combine the sine and cosine functions to provide a control signal; and
control an actuator in the EPS system via the control signal to attenuate smooth road shake vibrations in the steering wheel of the vehicle during the operation of the vehicle.

10. The EPS system of claim 9, wherein the processor is configured to process the sine and cosine functions when the vehicle is traveling at a substantially constant speed exceeding 45 miles per hour (72.42 kilometers per hour).

11. The EPS system of claim 9, wherein the processor is further configured to:
perform a Fast Fourier Transform (FFT) analysis on the amplitude components to provide FFT data; and
process the FFT data to provide the corrected average angular wheel speed.

12. The EPS system of claim 11, wherein the processor is configured to process the FFT data when the vehicle comes to a stop.

13. An Electronic Power Steering (EPS) system, comprising:
  a sensor providing a signal representative of a speed of a vehicle;
  a torque sensor providing a torque signal from a steering wheel during operation of the vehicle; and
  a processor coupled to the sensor and the torque sensor for processing the signal and the torque signal to:
    determine an average wheel angle using the signal representative of the speed of the vehicle as an estimation of an average angular wheel speed of a wheel of the vehicle during the operation of the vehicle;
    generate sine and cosine functions of the average angular wheel angle;
    process the sine and cosine functions with a steering wheel torque signal received from a torque sensor to extract amplitude components of at least one of the sine and cosine functions;
    perform a Fast Fourier Transform (FFT) analysis on the amplitude components to provide FFT data;
    process the FFT data to provide a corrected average angular wheel speed;
    generate a first offset value and a first offset polarity;
    apply the first offset polarity and a percentage of the first offset value when generating the sine and the cosine functions of the average angular wheel angle; and
    set a current offset polarity as negative when a current offset value exceeds the first offset value else set the offset polarity as positive;
    reconstruct the sine and cosine functions using the steering wheel torque signal;
    combine the sine and cosine functions to provide a control signal; and
    control an actuator in the EPS system via the control signal to attenuate smooth road shake vibrations in the steering wheel of the vehicle during the operation of the vehicle.

14. The EPS system of claim 13, wherein the processor is further configured to:
  apply the current offset value and the current offset polarity when generating the sine and the cosine functions of the average angular wheel angle; and
  compare the current offset value with a threshold value and maintain the current offset value when the current offset value is below the threshold value.

15. A vehicle, comprising:
  wheels by which the vehicle can be propelled and steered via a steering wheel duration operation of the vehicle;
  an Electronic Power Steering (EPS) system having a torque sensor coupled to the steering wheel for a torque signal and an actuator coupled to the steering wheel for attenuating smooth road shake vibrations in the steering wheel during the operation of the vehicle;
  a sensor providing a signal representative of a speed of the vehicle; and
  a processor coupled to the sensor and the EPS system for processing the signal and the torque signal to:
    determine an average wheel angle using the signal representative of the speed of the vehicle as an estimation of an average angular wheel speed of a wheel of the vehicle during the operation of the vehicle;
    generate sine and cosine functions of the average angular wheel angle;
    process the sine and cosine functions with a steering wheel torque signal received from a torque sensor to extract amplitude components of at least one of the sine and cosine functions;
    process the amplitude components to provide a corrected average angular wheel speed;
    reconstruct the sine and cosine functions using the steering wheel torque signal;
    combine the sine and cosine functions to provide a control signal; and
    control the actuator in the EPS system via the control signal to attenuate the smooth road shake vibrations in the steering wheel of the vehicle.

16. The vehicle of claim 15, wherein the processor is configured to process the sine and cosine functions when the vehicle is traveling at a substantially constant speed exceeding 45 miles per hour (72.42 kilometers per hour).

17. The vehicle of claim 15, wherein the processor is further configured to:
  perform a Fast Fourier Transform (FFT) analysis on the amplitude components to provide FFT data; and
  process the FFT data to provide the corrected average angular wheel speed.

18. The vehicle of claim 17, wherein the processor is configured to process the FFT data when the vehicle comes to a stop.

19. A vehicle of claim 17, comprising:
  wheels by which the vehicle can be propelled and steered via a steering wheel duration operation of the vehicle;
  an Electronic Power Steering (EPS) system having a torque sensor coupled to the steering wheel for a torque signal and an actuator coupled to the steering wheel for attenuating smooth road shake vibrations in the steering wheel during the operation of the vehicle;
  a sensor providing a signal representative of a speed of the vehicle; and
  a processor coupled to the sensor and the EPS system for processing the signal and the torque signal to:
    determine an average wheel angle using the signal representative of the speed of the vehicle as an estimation of an average angular wheel speed of a wheel of the vehicle during the operation of the vehicle;
    generate sine and cosine functions of the average angular wheel angle;
    process the sine and cosine functions with a steering wheel torque signal received from a torque sensor to extract amplitude components of at least one of the sine and cosine functions;
    process the amplitude components to provide a corrected average angular wheel speed;
    generate a first offset value and a first offset polarity;
    apply the offset polarity and a percentage of the first offset value when generating the sine and the cosine functions of the average angular wheel angle; and
    set a current offset polarity as negative when a current offset value exceeds the first offset value else set the offset polarity as positive;
    reconstruct the sine and cosine functions using the steering wheel torque signal;
    combine the sine and cosine functions to provide a control signal; and
    control the actuator in the EPS system via the control signal to attenuate the smooth road shake vibrations in the steering wheel of the vehicle.

20. The EPS system of claim 19, wherein the processor is further configured to:

apply the current offset value and the current offset polarity when generating the sine and the cosine functions of the average angular wheel angle; and compare the current offset value with a threshold value and maintain the current offset value when the current offset value is below the threshold value.

* * * * *